Nov. 17, 1959     W. B. FAHRENBACH     2,912,808
BANDING MACHINE
Filed Oct. 14, 1954     10 Sheets-Sheet 4
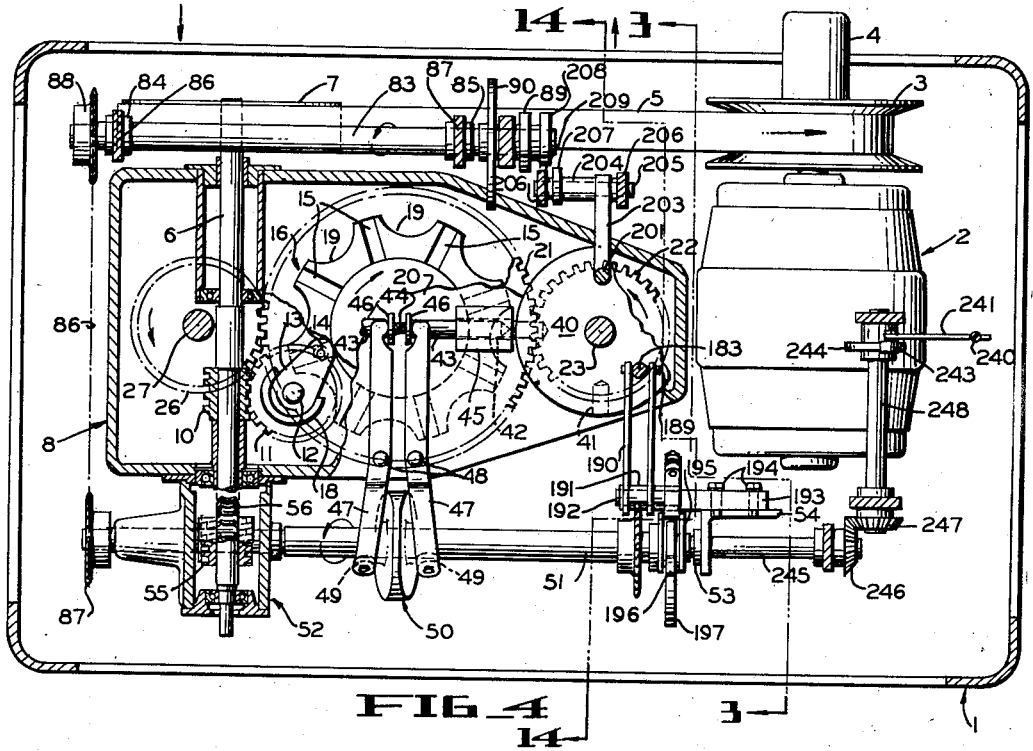
FIG_4
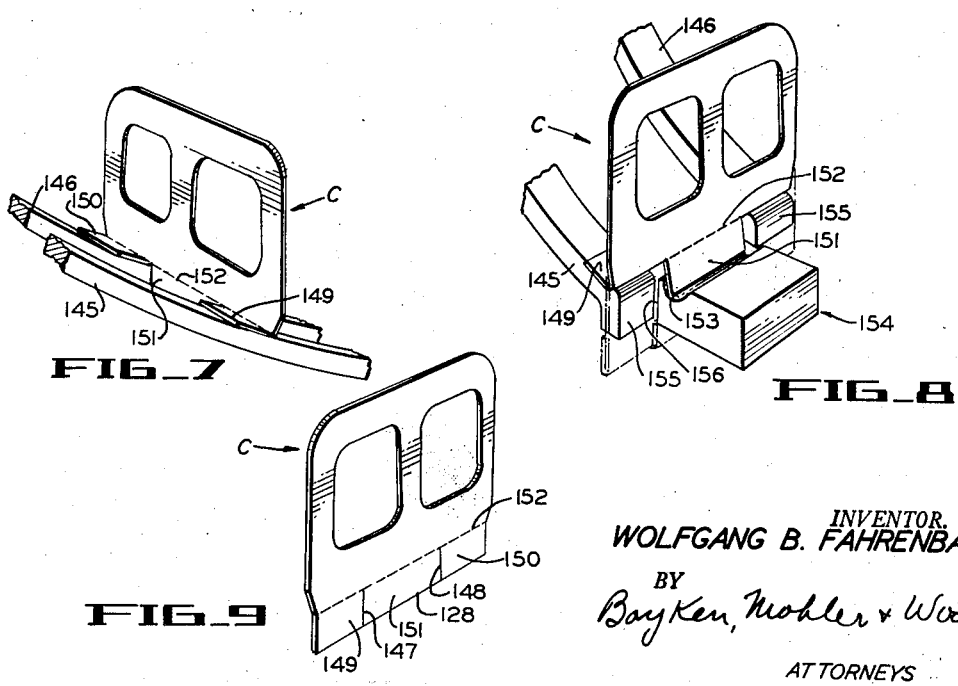
FIG_7     FIG_8
FIG_9
INVENTOR.
WOLFGANG B. FAHRENBACH
BY
Buckhorn, Blore, Klarquist & Sparkman
ATTORNEYS Nov. 17, 1959  W. B. FAHRENBACH  2,912,808
BANDING MACHINE
Filed Oct. 14, 1954  10 Sheets-Sheet 5
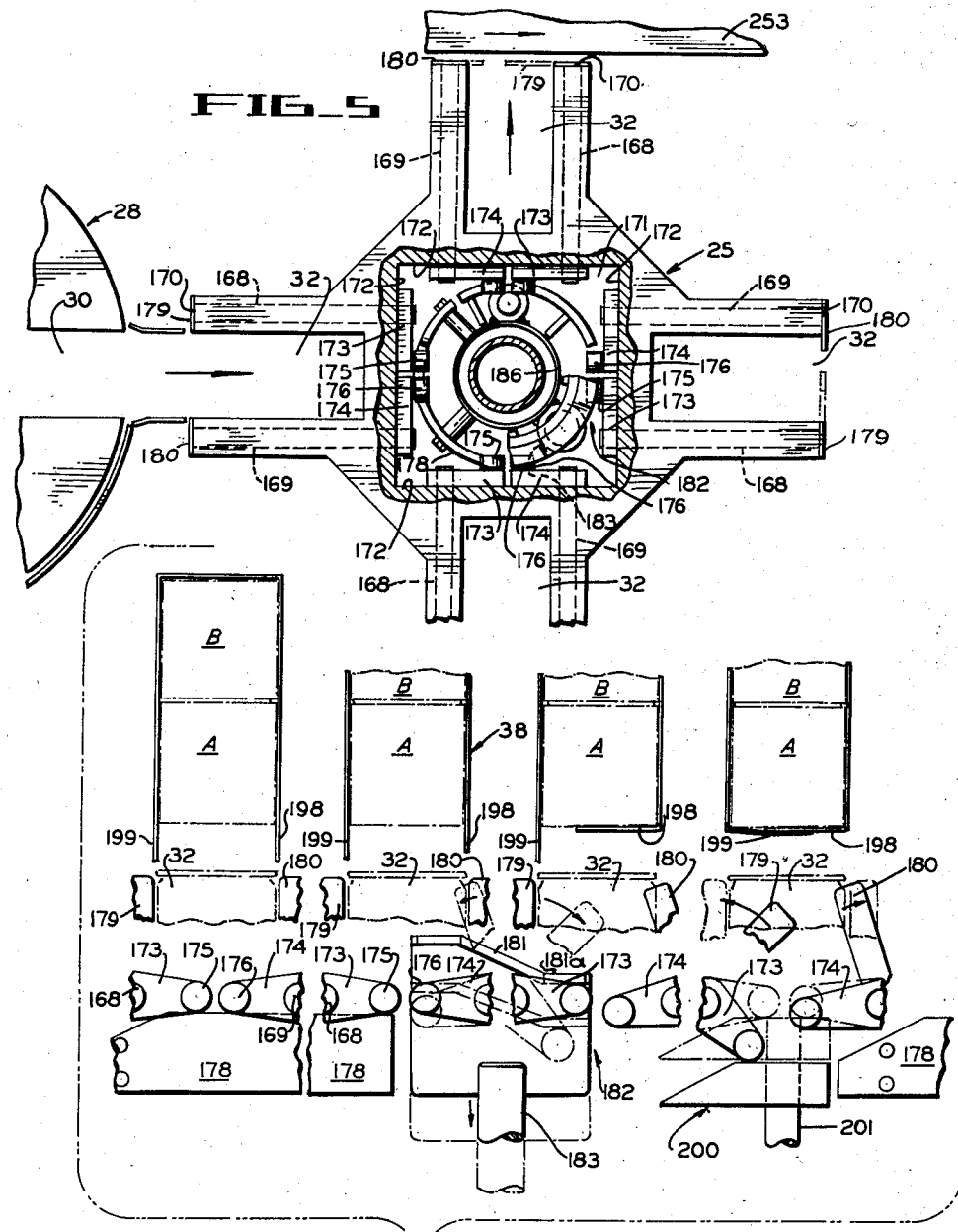
INVENTOR.
WOLFGANG B. FAHRENBACH
BY
Boyken, Mohler & Wood
ATTORNEYS

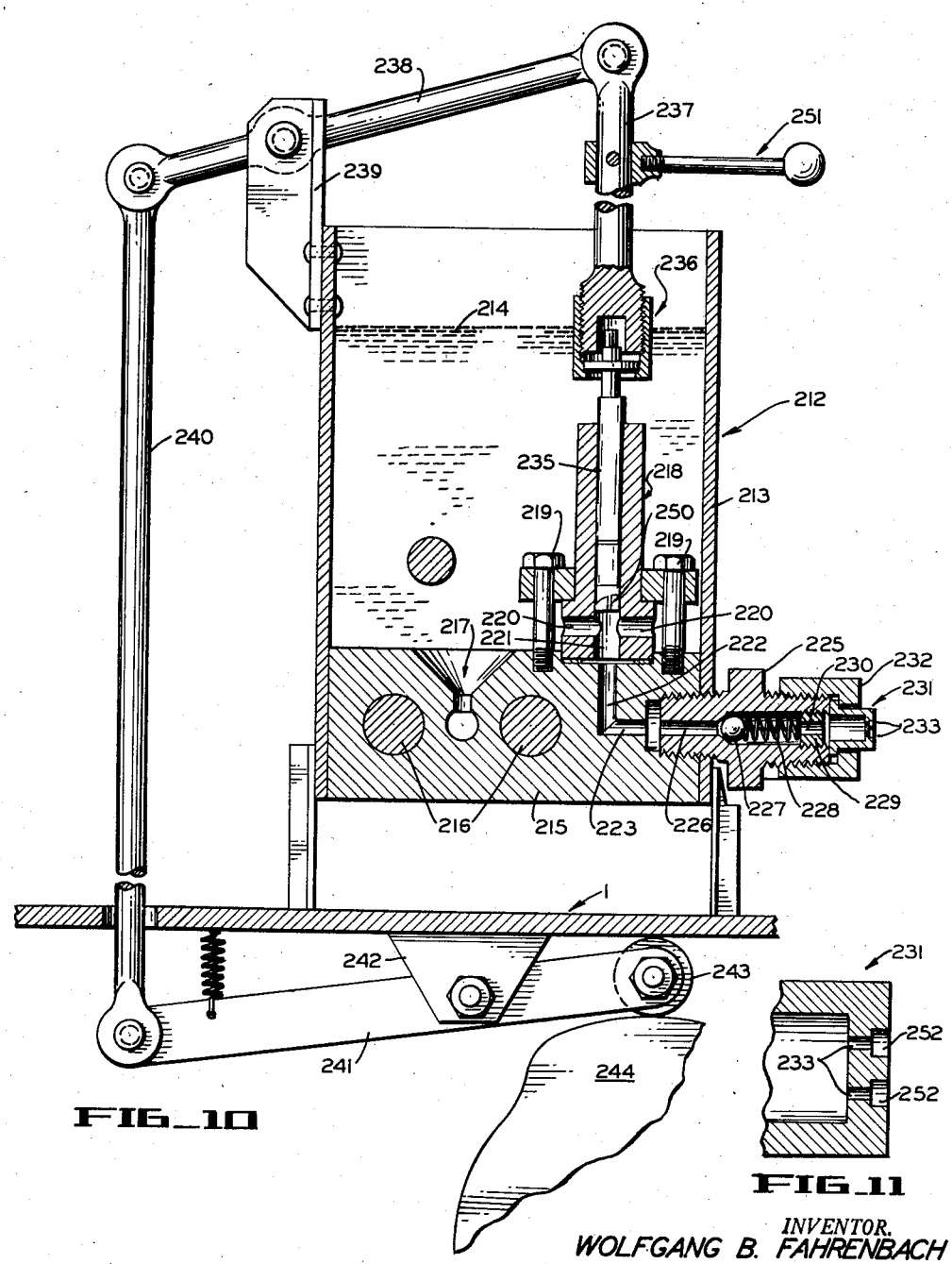

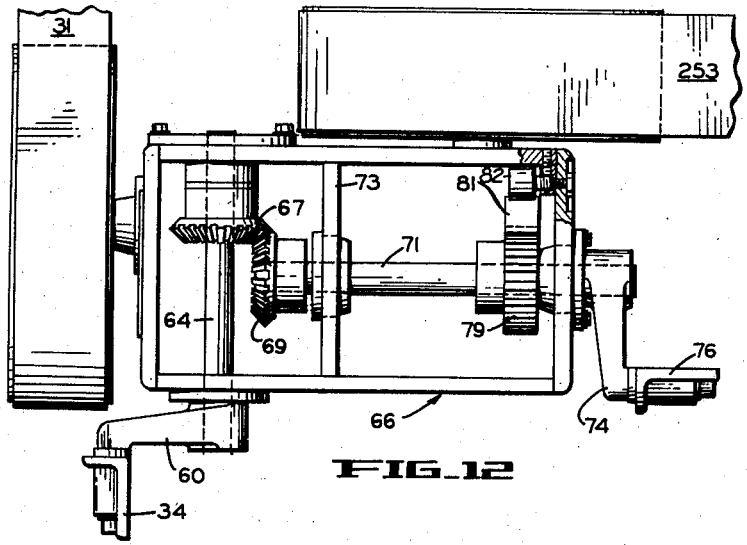
FIG_12
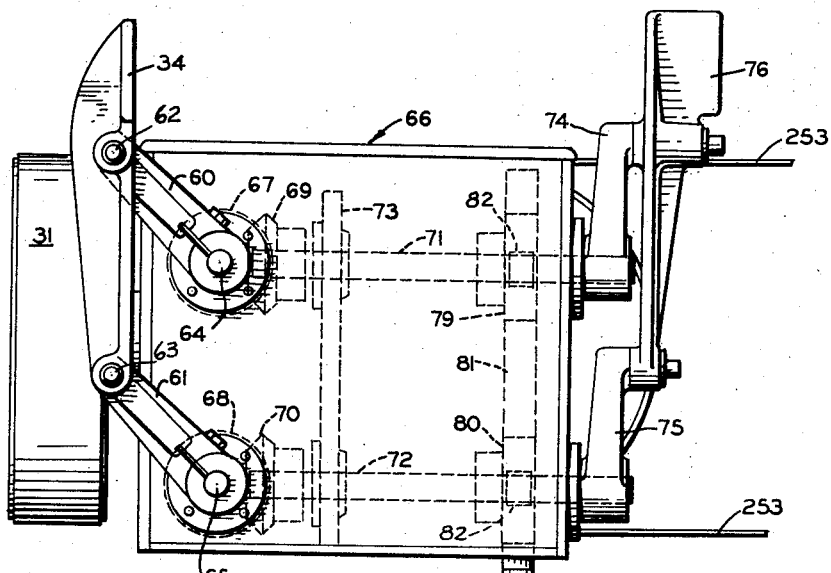
FIG_13
INVENTOR.
WOLFGANG B. FAHRENBACH
ATTORNEYS

Nov. 17, 1959 W. B. FAHRENBACH 2,912,808
BANDING MACHINE
Filed Oct. 14, 1954 10 Sheets-Sheet 8
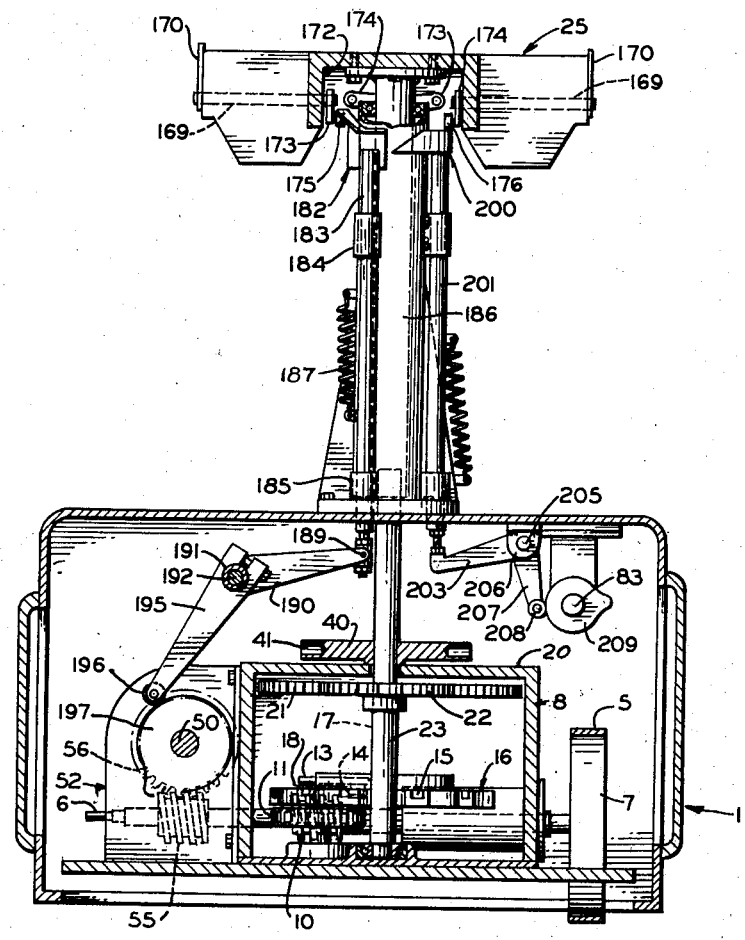
FIG_14
INVENTOR.
WOLFGANG B. FAHRENBACH
BY
Boykin, Mohler + Wood.
ATTORNEYS Nov. 17, 1959     W. B. FAHRENBACH     2,912,808
BANDING MACHINE
Filed Oct. 14, 1954     10 Sheets-Sheet 9
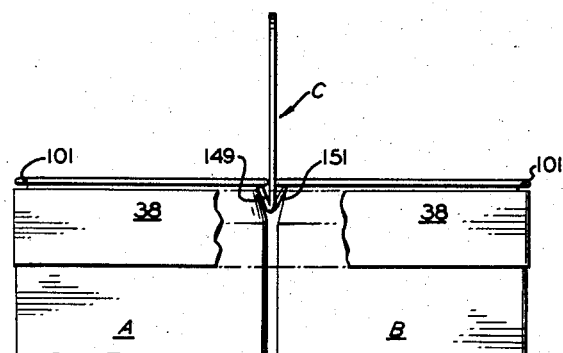
FIG_15
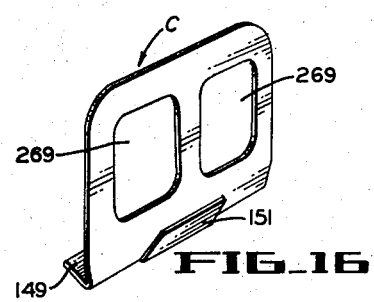
FIG_16
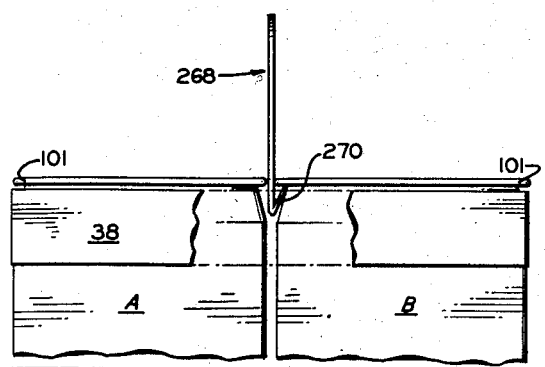
FIG_17
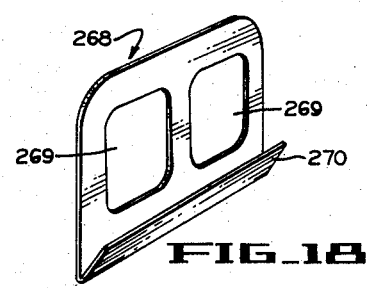
FIG_18
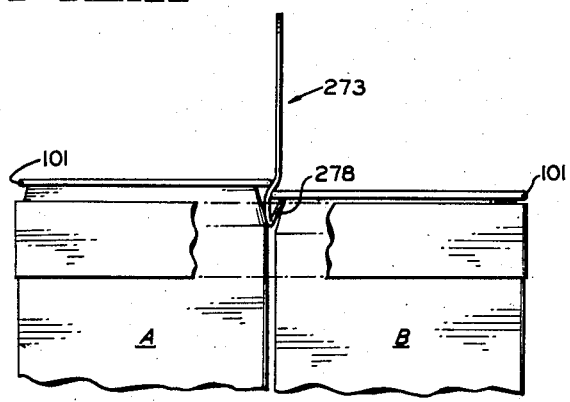
FIG_19
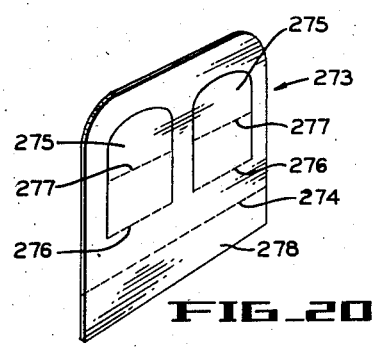
FIG_20
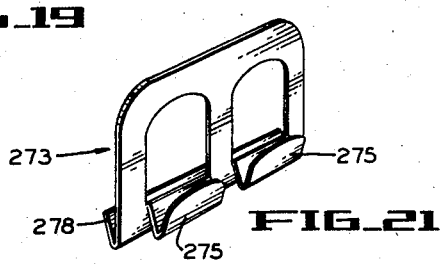
FIG_21
INVENTOR.
WOLFGANG B. FAHRENBACH
BY
Boyken, Mohler & Wood.
ATTORNEYS Nov. 17, 1959     W. B. FAHRENBACH     2,912,808
BANDING MACHINE
Filed Oct. 14, 1954     10 Sheets-Sheet 10
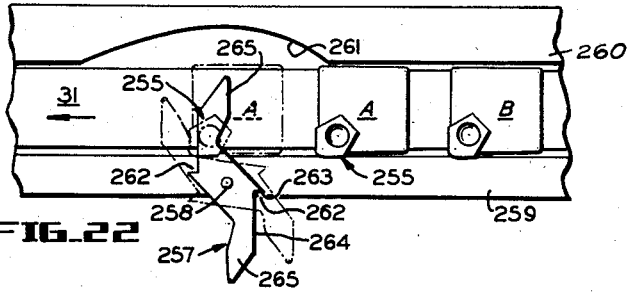
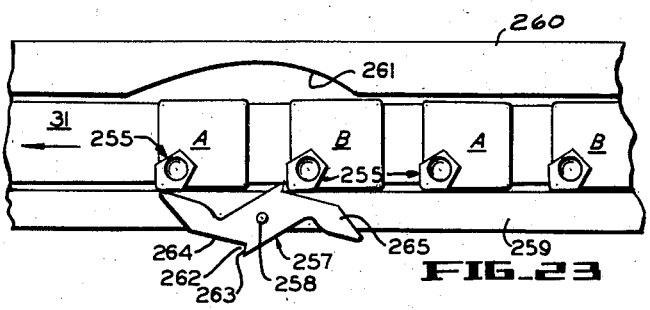
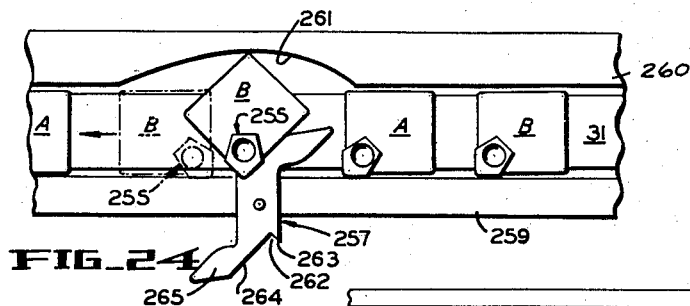
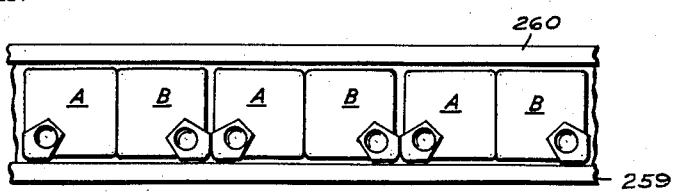
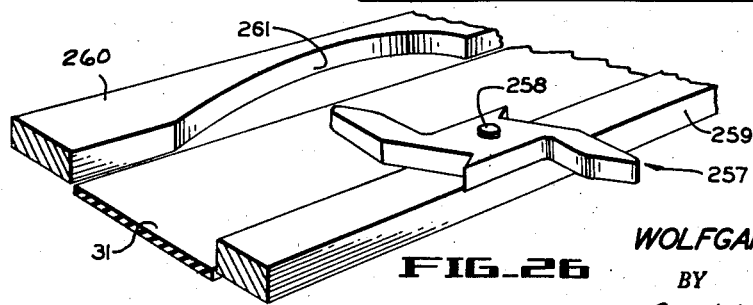
INVENTOR.
WOLFGANG B. FAHRENBACH
BY
ATTORNEYS United States Patent Office 2,912,808
Patented Nov. 17, 1959

2,912,808

BANDING MACHINE

Wolfgang B. Fahrenbach, Oakland, Calif., assignor to Edlo, Inc., San Francisco, Calif., a corporation of California Application October 14, 1954, Serial No. 462,347

1 Claim. (Cl. 53—134)

This invention relates to carriers for rectangular milk cartons and to a method and apparatus for packaging such cartons in pairs.

In the copending application for United States Letters Patent, Serial No. 251,404, filed October 15, 1951, now U.S. Patent No. 2,766,567, there is disclosed a machine and method for achieving somewhat the same object as the present invention. However, the band employed to hold the two cartons together in said copending application is of relatively heavy paper or cardboard. It has been found that the materials from which the elements of the carrier are formed must be extremely inexpensive to make the finished package competitive. For this reason an important object of the present invention is the provision of a method and machine adapted to package a pair of cartons, such as milk cartons so as to use inexpensive, relatively light paper to as great an extent as possible. In this connection the present invention contemplates a method and apparatus which can be operated at a relatively high speed to keep up with conventional carton filling equipment thus minimizing the cost as much as possible. Furthermore, the present invention is adapted to be employed with high speed banding devices such as that disclosed in United States patent application Serial No. 388,330, filed October 26, 1953, now U.S. Patent No. 2,815,626.

Another object of the invention is the provision of a method and apparatus for assembling a pair of filled cartons which requires very little floor space and is adapted to be employed with conventional carton fillers without much modification of the plant arrangement. In this connection the present invention takes advantage of rotary feeding means as opposed to straight line feeding means as in copending application Serial No. 251,404.

Still another object of the invention is the provision of a novel gluing means which is adapted to secure a paper band around a pair of cartons with greater effectiveness than that obtainable with a heavy cardboard band secured by interlocking tabs, stapling, or other conventional means.

Yet another object of the invention is the provision of a novel carrier handle and band and a method of applying the same to the package. In this connection the invention contemplates an improvement in economy and effectiveness over the handles and bands shown in copending patent applications, Serial No. 334,858, filed February 3, 1953, now U.S. Patent No. 2,694,596; 217,820, filed March 27, 1951, now U.S. Patent No. 2,696,400; 198,938, filed December 4, 1950, now U.S. Patent No. 2,693,385; 251,294, filed October 15, 1951, now U.S. Patent No. 2,696,401; 346,847, filed April 6, 1953, now abandoned; 258,397, filed November 27, 1951, now abandoned; 300,893, filed July 25, 1952, now abandoned; 233,280, filed June 25, 1951, now U.S. Patent No. 2,713,508.

Other objects and advantages will be apparent from the following specification and from the drawings:

Fig. 4 is a horizontal cross section through the main housing as taken along lines 4—4 of Fig. 3 and showing the main drive mechanism.

Fig. 5 is a top plan view of the main carton supporting turntable with the top of the latter broken away to show the operation of the folding fingers and their associated mechanism.

Fig. 6 is a semischematic view showing the successive steps in folding the band and the operation of the cams which perform such folding steps.

Fig. 7 is a fragmentary perspective view of a portion of the handle flap folding means showing the operation thereof on a handle.

Fig. 8 is a fragmentary perspective view of another portion of the flap folding means.

Fig. 9 is a perspective view of a handle before the folding operations are performed.

Fig. 10 is a vertical cross section through the glue applicator.

Fig. 11 is a greatly enlarged cross section through the discharge nozzle of the glue applicator of Fig. 10.

Fig. 12 is a horizontal cross section through the carton transfer device.

Fig. 13 is a vertical side elevation of the device of Fig. 12.

Fig. 14 is a vertical cross section of the apparatus of the invention as taken along lines 14—14 of Fig. 4 showing portions of both turntables.

Fig. 15 is a fragmentary side elevation of the top of a pair of cartons with the band broken away to show the handle of Figs. 7–9 in engagement with the cartons.

Fig. 16 is a perspective view of the band of Fig. 9 as folded.

Figs. 17, 18 show a modified form of handle.

Fig. 19 is a view similar to Fig. 15 showing the handle of Fig. 18 as used when the cartons are vertically offset slightly.

Figs. 20, 21 are perspective views of a modified form of handle.

Figs. 22–24 are fragmentary top plan views of a portion of the feed conveyor showing the turning device in operation.

Fig. 25 is a schematic top plan view of a row of cartons after the same have been arranged by the turning device.

Fig. 26 is a perspective of the turning device.

*Drive mechanism*

Figure 1:
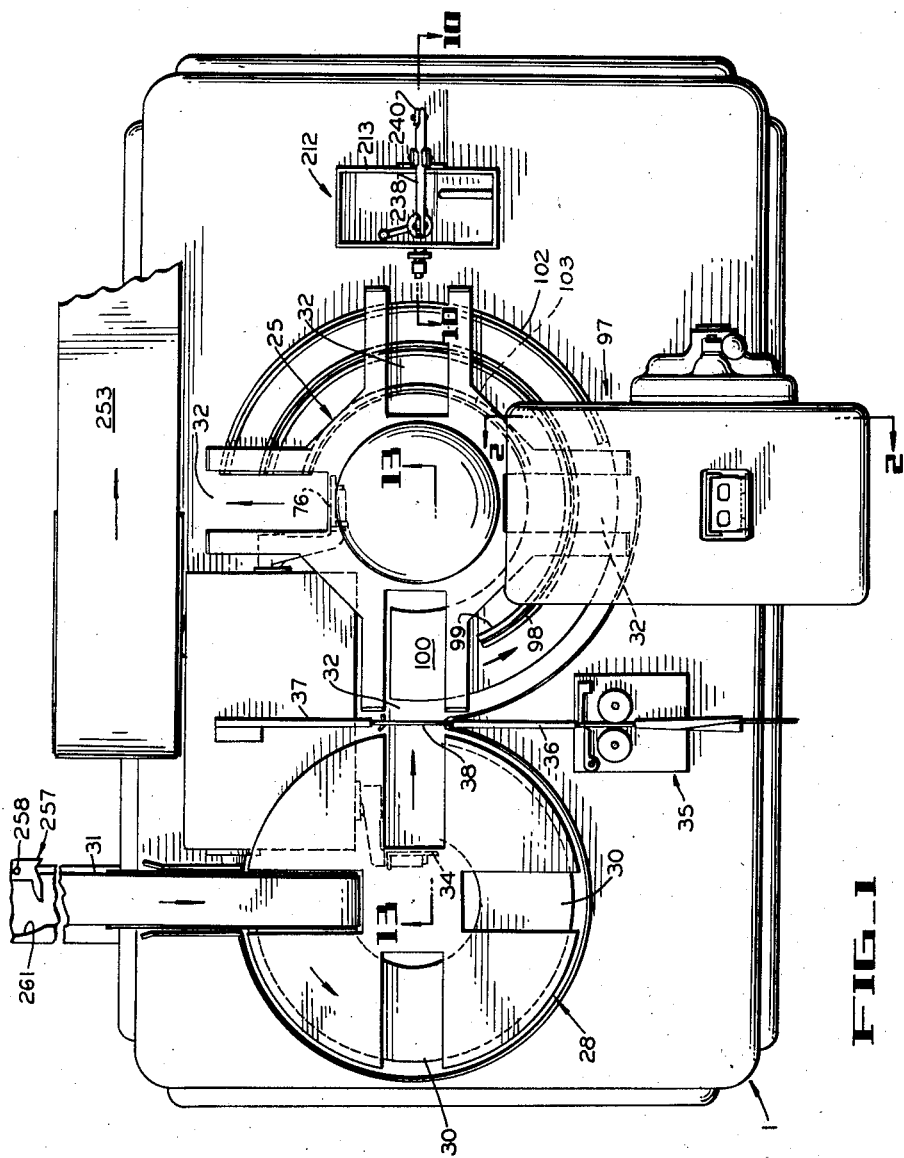
Fig. 1 is a top plan view of the apparatus of the present invention.

In detail, the invention comprises a housing, generally designated 1 in which is mounted a motor 2 (Fig. 4) provided with a variable speed drive including a pulley 3 on the output shaft 4 of motor 2. Belt 5 is mounted on pulley 3 and serves to drive a shaft 6, parallel to motor shaft 4, through a pulley 7.

Shaft 6 is rotatably mounted adjacent its opposite ends in the sidewalls of an inner housing 8. Intermediate the ends of shaft 6 the same is provided with a worm 10 which is in mesh with a worm wheel 11 mounted on a vertically extending shaft 12 rotatably supported at its upper and lower ends in bearings.

Secured to shaft 12 is a radially extending Geneva arm 13 provided with a roller 14 at its outer end and which roller is adapted to be successively received in radially outwardly extending slots 15 in a Geneva wheel 16 mounted on a vertically extending shaft 17 (Fig. 14). The Geneva wheel 16 shown has eight slots 15 so that the rotation of shaft 17 is one eighth of a revolution for each rotation of shaft 12.

As will be understood later on, it is very important that the shaft 17 be indexed the same number of degrees for each rotation of shaft 12. To this end there is provided on shaft 12 and under the Geneva arm 13 a circular plate 18 concentric with the shaft 12 and adapted to be received in radially outwardly directed, complementarily formed recesses 19 on wheel 16 so that for a portion of each revolution of shaft 12 the shaft 17 is held stationary.

Above the Geneva wheel 16 but under the top 20 of inner housing 8 is a relatively large gear 21 which is keyed to shaft 17 and in mesh with a somewhat smaller gear 22 carried by a vertically extending shaft 23 rotatably supported in the inner housing 8 (Figs. 4, 14).

Shaft 23 extends upwardly through the top 20 of inner housing 8 and carries at its upper end, the carton supporting turntable generally designated 25 (Figs. 1, 14) which will subsequently be described.

Also in mesh with the large gear 21 and on the opposite side of the same from gear 22 is another gear 26 mounted on a vertical shaft 27 rotatably supported in inner housing 8. Shaft 27 carries at its upper end the carton feed turntable 28 referred to in copending application Serial No. 388,330, filed October 26, 1953 (Fig. 1).

From the above described arrangement it will be seen that the feed turntable 28 and the carton support turntable 25 are made to rotate in the same direction and at the same speed. The number of teeth on gear 21 is twice the number on gears 22, 26 so that for each ⅛ rotation of gear 21 the turntables 25, 28 rotate ¼ revolution each.

The carton feed turntable 28 is provided with four equally spaced radially outwardly opening carton receiving pockets or slots 30 each of which is adapted to receive two cartons therein. Feed conveyor belt 31 is positioned in alignment with one of said slots 30 (Fig. 1) when the turntable 28 is stationary, so that a pair of cartons is received in each slot 30 upon each 90 degree rotation of the turntable 28.

After the turntable 28 has been indexed three times through a total of 270 degrees a pair of cartons received from feed belt 31 are in alignment with one of the four radially outwardly opening slots or pockets 32 in the turntable 25. The pair of cartons are then transferred from one of the slots 30 in turntable 28 to one of the pockets 32 in turntable 25 by means of a transfer plate 34 which will subsequently be described.

Between the turntables 25, 28 is a band feeding device generally designated 35 and described in detail in copending patent application Serial No. 388,330, filed October 26, 1953. The device 35 includes a pair of spaced band supports 36, 37 between which is extended an elongated band 38 of relatively light material such as paper as described in said application. As each pair of cartons is transferred from turntable 28 to turntable 25 the band 38 is pushed into the registering pocket 32 of turntable 25 ahead of said cartons. Prior to such movement of band 38 the same is cut from a relatively large strip of material by the device 35 as described in the copending application.

Referring again to the turntable driving mechanism of Fig. 4 it will be seen that the intermittent rotation of the turntable shafts 23, 27 by the Geneva drive 12, 13, 14 results in the turntables 25, 28 being at rest a considerably longer period of time than they are in motion so that there is sufficient time for the performance of certain operations to be subsequently described. In this connection it is important that the turntables 25, 28 be held stationary at 90° angularly spaced positions during the time the above operations are performed. Furthermore, some means is required to insure that said turntables rotate exactly 90° upon each movement. Said means will now be described.

Mounted on each turntable shaft 23, 27 above the top of inner housing 8 is a disc 40 (only the disc on shaft 23 being shown in Fig. 4). Each disc 40 is provided with 90° spaced frusto-conical radially outwardly opening sockets 41 adapted to receive therein the complementarily formed end 42 of an elongated pin 43. There are two pins 43 arranged in alignment so that one pin cooperates with one disc 40. The pins 43 extend outwardly from discs 40 almost into meeting relationship and are urged away from each other by a compression spring 44 (Fig. 4). Said pins 43 are slidably supported in bearings 45 secured to the top of housing 8.

The pins 43 are provided at their adjacent ends with flanges 46 which are engaged by the corresponding ends of a pair of elongated levers 47 pivotally supported intermediate their ends for horizontal swinging by means of pins 48. The opposite ends of levers 47 are provided with rollers 49 which are urged toward each other by spring 44 against the opposite sides of a double face cam 50.

Cam 50 is secured to a horizontally extending shaft 51 rotatably supported intermediate its ends in a gear box 52 and at one end in a bearing 53 carried by a suitable frame member 54.

Within gear box 52, shaft 6, above described, is provided with a worm 55 which in turn is in mesh with a worm gear 56 secured to shaft 51.

The gear ratios of drive worm and gear 10, 11 and the worm and gear 55, 56 is such that the cam 50 spreads apart the adjacent ends of levers 47 to withdraw the pins 43 from discs 40 just before shafts 23, 27 start to rotate. The contour of the face cam 50 is also designed so that the levers 47 are released to permit spring 44 to urge the pins 43 into the sockets 41 of discs 40 just after the shafts 23, 27 have stopped.

By the above structure the pins 43 act as centering devices for shafts 23, 27 and at the same time lock the shafts in their proper angular relationship after indexing.

*Carton transfer means*

Referring again to the transfer plate 34 (Figs. 1, 12, 13) the same is disposed vertically adjacent the inner end of the slot 30 that is adjacent turntable 25 and is adapted to be moved horizontally to the right as seen in Figs. 1, 12, 13 to push the cartons out of said slot into the corresponding opposed pocket 32 in turntable 25.

Figure 3:
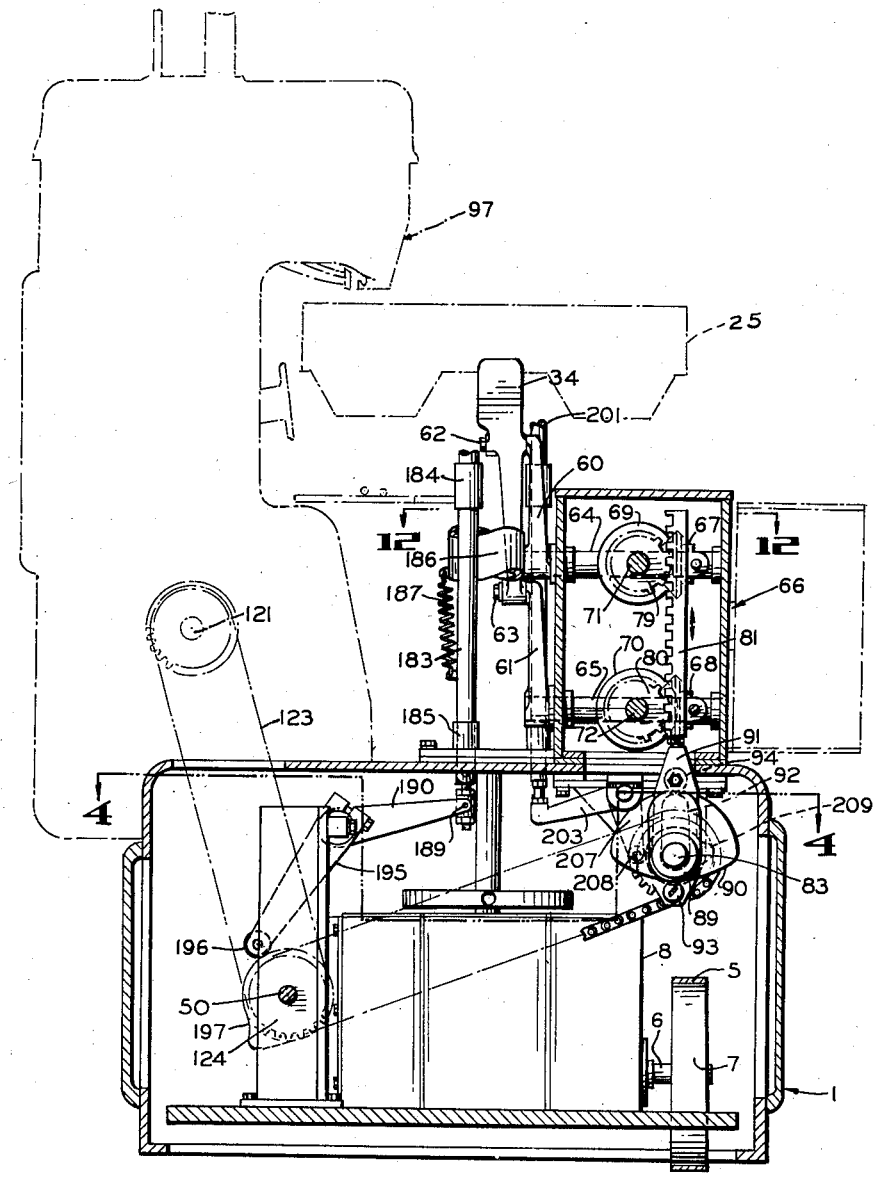
Fig. 3 is a vertical section through the main carton of the invention showing the main drive mechanism and showing the handle inserting device in dot-dash line.

The mechanism for actuating transfer plate 34 is best seen in Figs. 3, 12 and 13 and comprises a pair of arms 60, 61 that are rotatably secured at their corresponding ends to plate 34 at spaced points along the length of the latter by journals 62, 63 respectively. The upper portion of plate 34 is flat so as to engage the trailing side of the pair of cartons in the slot 30 (Fig. 3). The opposite corresponding ends of arms 60, 61 are secured to vertically spaced horizontally extending shafts 64, 65 which are rotatably supported in bearings in opposite sides of a relatively small housing generally designated 66 and secured to the top of the main housing 1.

Shafts 64, 65 are provided with bevel gears 67, 68 which are in mesh with similar bevel gears 69, 70 mounted on shafts 71, 72 extending at right angles to shafts 64, 65. Shafts 71, 72 are rotatably supported adjacent bevel gears 69, 70 in suitable bearings carried by a cross member 73 of housing 66. Said shafts extend through bearings in the end wall of housing 66 at their opposite ends and carry arms 74, 75 respectively which are similar to arms 60, 61 above described. Arms 74, 75 are pivotally supported at their outer ends in a discharge plate 76 which may be identical to transfer plate 34 above described.

Secured to shafts 71, 72 are pinions 79, 80 respectively, which are both in mesh with an elongated vertically extending rack 81 (Fig. 3). On the side of rack 81 opposite the gear teeth, idler rollers 82 are provided at spaced points along the length of said rack to insure vertical translation of the same. Said rollers may be rotatably supported on pins secured to the same end of housing 66 through which shafts 71, 72 extend.

The rack 81 is actuated through a mechanism to be subsequently described from a jack shaft 83 (Fig. 4) which extends parallel to shaft 50 and on the opposite side of inner housing 8. At spaced points along its length jack shaft 83 is rotatably supported in bearings 84, 85 which are supported, by means of appropriate brackets 86, 87 respectively from the top of housing 1.

Torque is applied to shaft 83 by means of a sprocket chain 86 which meshes with a sprocket wheel 87 on driving shaft 50 and with a sprocket wheel 88 on driven shaft 83.

Adjacent the lower end of the rack 81 the shaft 83 is provided with a pair of radial cams 89, 90 which are positioned on opposite sides of a plate 91 which is rigidly secured to the lower end of rack 81. The plate 91 is provided with a vertically elongated slot 92 for receiving the shaft 83 therethrough and to permit vertical reciprocation of the plate 91 with rack 81.

Cams 89, 90 are positioned so as to be in rolling engagement with rollers 93, 94 respectively, which in turn are rotatably supported on suitable pins on plate 91. The action of cam 90 is to positively urge the rack 81 upwardly while the cam 89 positively urges the same downwardly. Both cams 89, 90 are in rolling engagement with rollers 93, 94 respectively at all times so that no lost motion is present.

Cams 89, 90 are formed so that the rack 81 is at rest in its upper position for about a one-half rotation of shaft 83 and moving downwardly and upwardly for the remaining half rotation. As can be best seen in Fig. 13, upward movement of rack 81 causes the transfer plate 34 to be moved to its left hand position while downward movement causes the plate to be moved to the right, pushing the cartons out of slots 30 in turntable 28 and into pockets 32 in turntable 25. Plate 34 is thus normally behind the cartons in the position shown in Fig. 12 while the turntable 28 is rotating.

The gear ratio between shafts 6 and 50 and between sprockets 87, 88 is, of course, such that shaft 83 makes one rotation for each quarter rotation of turntable 28.

*Carton spreading means*

Figure 2:
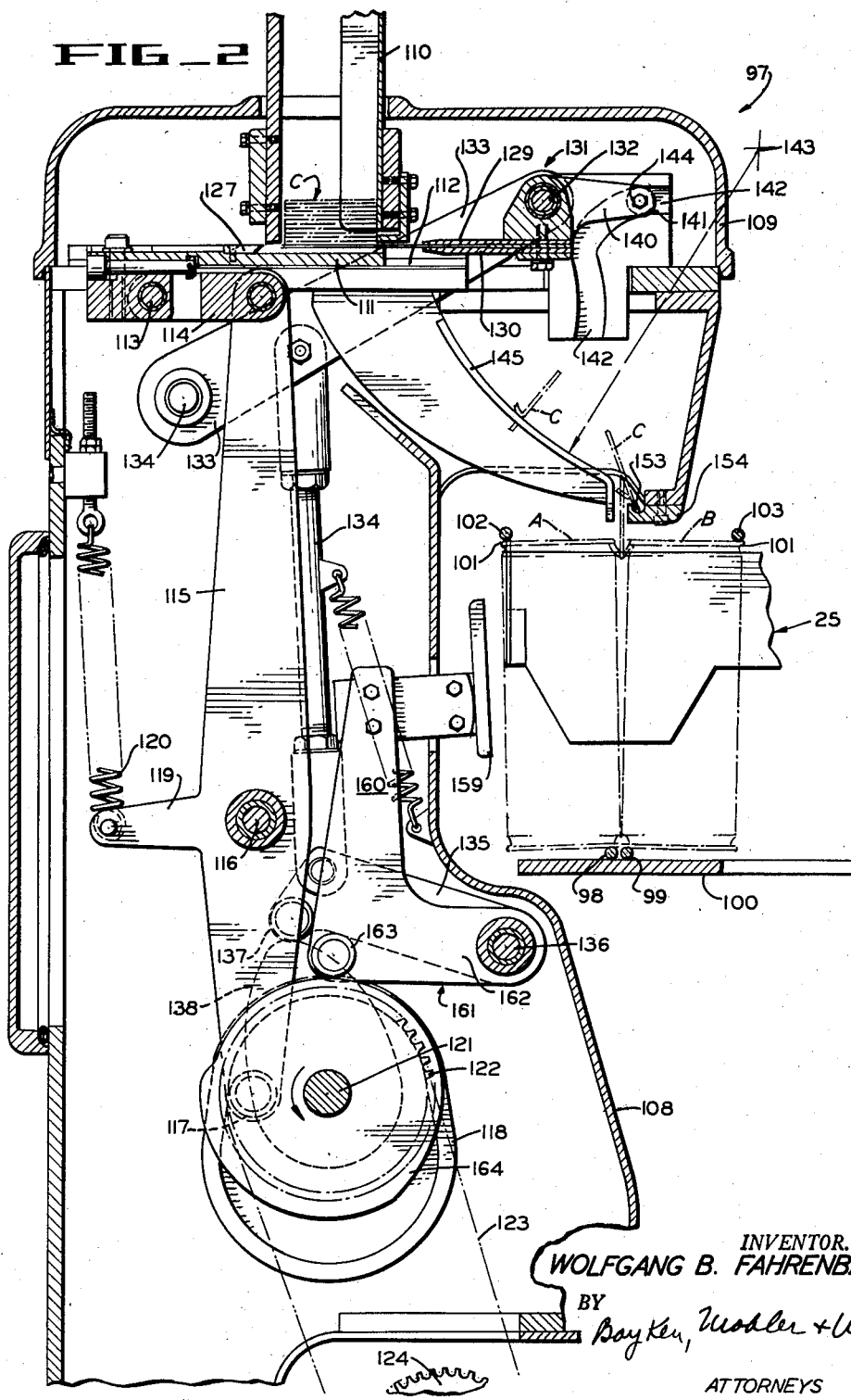
Fig. 2 is a vertical section through the handle forming and inserting device as taken along lines 2—2 of Fig. 1.

When a pair of cartons are received in the pocket 32 of turntable 25 that is adjacent the feed turntable 28 said pair are transferred, by the succeeding quarter revolution of the turntable 25, to a position adjacent a handle inserting device generally designated 97 (Figs. 1, 2, 3). As the pair of cartons move toward the handle inserting device they are engaged along their bottoms by a pair of stationary rods 98, 99 which are curved to a circular arc concentric with the turntable 25 and supported on a suitable stationary support 100.

The rods 98, 99 are so positioned that the cartons are raised slightly so as to disengage the tops of the cartons from the top of turntable 25. In this connection it will be noted that the cartons A, B (Fig. 2) are of a uniform square cross section along their lengths except that a circumferentially extending lip 101 is provided on the top of each carton. When the pair of cartons A, B are inserted into the turntable 25 the cartons may be squeezed somewhat between the sides of the pocket 32 so that the weight of the cartons is taken partially by the lips 100.

It will be apparent that the action of the rods 98, 99 is to urge the cartons upwardly at their adjacent sides so that they tilt oppositely outwardly as seen in Fig. 2 to provide a space between the lips of adjacent cartons A, B.

If desired, an additional pair of stationary rods 102, 103 may be provided just above the outer and inner sides respectively of cartons A, B so as to insure the separation of the cartons as above described.

By the present invention, a carrying handle is inserted into the space between the cartons when they are in the position of Fig. 2. This structure will now be described.

*Handle inserting device*

The handle inserting device comprises a housing 108 which may be secured to the main housing 1 by any desired means. A removable cover 109 is provided through which extends an elongated handle magazine 110.

Magazine 110 is open at its lower end so that the stack of handle blanks C received therein are supported on a slide 111 which is supported for horizontal reciprocation on ways 112. Between the ways 112 the slide 111 is provided with a transversely extending pin 113 to which is pivotally secured one end of a generally horizontally extending link 114. The opposite end of link 114 is pivotally secured to the upper end of a generally vertically extending operating arm 115 which is swingably secured intermediate its ends on a shaft 116 which in turn is mounted on housing 108. The lower end of arm 115 is provided with a roller 117 which cooperates with a face cam 118.

Adjacent the shaft 116 the arm 115 is provided with an extension 119 to which is secured one end of an extension spring 120 for urging the arm 115 in a clockwise direction at all times and into engagement with face cam 118.

The face cam 118 is mounted on a rotatable shaft 121 which is provided with a sprocket wheel 122. Shaft 121 may be mounted in suitable bearings secured to the opposite lateral sides of housing 108. A sprocket chain 123 connects sprocket wheel 122 with a similar wheel 124 on shaft 50 in housing 1 and hereinbefore described. Sprocket wheels 122, 124 have the same number of teeth so that for each rotation of shaft 50 (which represents a quarter of a turn of turntable 25) the face cam 118 makes one revolution and actuates the arm 115 through one cycle.

The slide 111 which supports the stack of handle blanks C is urged to the right by spring 120 from the normal position shown in Fig. 2. Secured to the top of slide 111 is a feeding element 127 having a knife edge that is adapted to engage the lower edge 128 of the lowermost handle blank C (Fig. 9) of the stack in magazine 110.

Upon translation of the handle blank C to the right as seen in Fig. 2 the upper end of said blank is received between a pair of jaws 129, 130 (Fig. 2) in a handle holder generally designated 131. This handle holder 131 is pivotally supported by means of a pin 132 on one end of an elongated arm 133 which is swingably mounted at its opposite end on a shaft 134 fixed to housing 108.

Adjacent shaft 134 the arm 133 is swingably secured to the upper end of a generally vertically extending connecting rod 134 which in turn is connected at its lower end to a relatively short link 135. Link 135 extends generally radially of the turntable 25 and is pivoted at its end opposite link 135 to a pin 136 secured to housing 108. Adjacent the connection with connecting rod 134 the link 135 is provided with a roller 137 which is in rolling engagement with a radial cam 138 also carried by shaft 121.

The radial cam 138 is designed so as to swing arm 133 in a downwardly extending arc from its position shown in Fig. 2. Such action of arm 133 also carries the handle holder 131 downwardly in arc as can be seen in Fig. 2.

It is desirable that the handle holder 131 oscillates during said downward movement for a reason that will subsequently be apparent. To this end the handle holder 131 is provided with an extension 140 on which is rotatably mounted a roller 141 which follows along a cam groove 142 stationarily secured in housing 108.

Under the combined influence of arm 133 and the cam groove 142 the handle holder 131 sweeps through a substantially circular arc so that the open end of jaws 129 travel along an arc having a center at point 143 as shown schematically in Fig. 2.

Stationarily mounted in housing 108 are a pair of guide strips 145, 146 which are formed to substantially the same arc as the path of travel of the open ends of jaws 129, 130.

Referring now to Fig. 9 it is seen that the handle blank C is preferably slitted as at 147, 148 thus dividing the lower end of the handle into three tabs 149, 150, 151 (Figs. 2, 7, 8).

The tab 151 is the central one and is somewhat wider than the outer tabs 149, 150.

The depth of the slot defined by jaws 129, 130 of handle holder 131 is such that the handle C is received therein up to the juncture between the tabs 149—151 and the remainder of handle C. This juncture is preferably defined by a transversely extending score line 152 or a row of perforations.

As the handle holder 131 is swung downwardly the outer tabs 149, 150 are engaged by the guide strips 145, 146 (Figs. 2, 9) so as to bend the same rearwardly about line 152.

Adjacent the lower end of the swing of holder 131 it is swung past a vertical position by the action of groove 142 and arm 133, as seen in Fig. 2, so that the central tab 151 is received in an upwardly opening channel 153 formed in a stationary guide piece 154 secured to housing 108.

Upon further downward movement of arm 133 the handle C is thrust downwardly between cartons A, B (Fig. 2). However, before entering the space between cartons A, B, the outer tabs 149, 150 are bent back against the remainder of handle C by a cammed portion 155 on each guide 145, 146. Similarly, the central tab 151 is bent in the opposite direction against the remainder of handle C by the face 156 of guide piece 154. Thus, the leading edge of handle C as the same is inserted between cartons A, B, is the score line 152 and the tabs 149—151 follow.

When the handle C is in the position of Fig. 2 a pusher member 159 (Fig. 2) is arranged so as to push the outer carton A radially inwardly of the turntable 25 into engagement with the inner carton B. This urges both cartons to a vertical position in closely adjoining relationship.

The pusher member 159 is secured to the outer end of one leg 160 of a lever generally designated 161 which includes another leg 162 at right angles to said leg 160. At the juncture between legs 160, 162 a roller 163 is provided which cooperates with a radial cam 164 on shaft 121.

Radial cam 164 is designed to urge the pusher member 159 against carton A and urge it radially inwardly of the turntable 25 after the radial cam 138 has caused the handle C to be inserted between the cartons A, B as above described.

During the time the pusher member 159 is urging the cartons A, B against each other, means is employed to hold the cartons together while the turntable 25 turns to the next station. Such means, which also functions to complete the banding operation will now be described.

*Band folding means*

Referring to Fig. 5, on each side of each pocket 32 the turntable 25 is horizontally bored to receive shafts 168, 169 which extend from the radially outwardly directed face 170 adjacent each pocket 32 inwardly to a relatively large downwardly opening square opening 171. Opening 171 is defined by four vertically disposed walls 172 through which the four pairs of shafts 168, 169 extend. At the inner ends of shafts 168, 169 the same are provided with levers 173, 174 respectively which extend toward each other and are provided at their corresponding adjacent ends with rollers 175, 176 respectively.

When a pocket 32 is in registration with a corresponding slot 30 in turntable 28, the levers 173, 174 are substantially horizontal and the rollers 175, 176 are in rolling engagement with the upper side of a stationary cam track 178 (Figs. 5, 6). To facilitate the understanding of the operation of the levers 173, 174 and the cams with which they are associated, they are illustrated schematically in Fig. 6 in four successive positions along with the band engaging fingers now to be described.

At the outer ends of shafts 168, 169 the same are provided with flat fingers 179, 180 respectively which are secured at right angles to said shafts and in wiping relation with the adjacent outwardly directed face 170 of turntable 25. In the first or left hand step of Fig. 6 the fingers 179, 180 are shown vertical and extending upwardly from the shafts 168, 169 to which they are secured. In such position feeding of the cartons A, B into pockets 32 and discharge therefrom is unobstructed. As will subsequently be seen, the fingers 179, 180 are swung toward each other successively, with finger 180 swinging first, so as to complete the wrapping of band 38 around the cartons A, B.

In the left hand position of Fig. 6, the rollers 175, 176 are in rolling engagement with the stationary cam track 178 which, at this point of the cycle is provided with an upwardly directed horizontally extending face on which the rollers 175, 176 roll thus maintaining the fingers 179, 180 vertical (Figs. 5, 6).

After the turntable 25 has rotated 90° with the cartons A, B to the handle inserting position at which the cartons are spread apart at their upper ends as shown in Fig. 2, the roller 176 is in a position under a vertically reciprocable cam member generally designated 182 (Fig. 6). Cam member 182 is provided with an offset cam track 181, the underside of which is engageable with the roller 176 and, upon downward movement of cam member 182 from the full line position to the dotted line position of Fig. 6, urges the finger 180 partially across the associated pocket 32 as shown in the second position of Fig. 6.

To effect downward movement of the cam member 182 a shaft 183 is provided which carries the cam member 182 at its upper end. Shaft 183 is supported for vertical reciprocation in a sleeve bearing 184 adjacent its upper end and a bearing 185 adjacent its lower end. Upper bearing 184 may be secured, as by welding, to a central stationary post 186 and lower bearing 185 may be likewise made rigid with the top of main housing 1 (Fig. 3).

The shaft 183 extends into housing 1 and is pivotally secured by a pin 189 to one end of an arm 190 which in turn is rigidly secured at its opposite end to a sleeve 191 (Fig. 4). Sleeve 191 is rotatable on a pin 192 which is provided with an extension 193 of square cross section for securement to angle bar 54 by means of bolts 194.

Also mounted on sleeve 191 is one end of an arm 195 which is provided at its opposite end with a roller 196 for engagement with a radial cam 197 (Fig. 3). The action of cam 197 is to raise and lower cam member 182 once for each 90° rotation of turntable 25. Spring 187 urges rod 183 upwardly at all times.

Thus, by the above structure, when the handle C is inserted between the cartons A, B and the latter have been urged radially inwardly by pusher member 159 (Fig. 2), cam member 182 is lowered to swing the finger 180 partially across the outer carton A (Fig. 6). By this action, the extension 198 of the band 38 is folded across the radially outwardly directed face of the outer carton A to the position shown in the third step of Fig. 6. The finger 180 also holds the cartons A, B, within their associated pocket of turntable 25. It will be understood that the band 38 is positioned between the cartons A, B and the sidewalls of pockets 32 with the extension 198 projecting outwardly from one side of the pocket. Similarly, projection 199 extends outwardly from the opposite side of the pocket 32.

It will be noted that finger 179, which is adapted to fold extension 199 of band 38 is not acted upon by cam 182 at the second step shown in Fig. 6.

The friction established between each shaft 168 and the turntable 25 is such that each shaft 168, 169 and its associated fingers and levers remain in whatever position they are positively moved to. In this manner, as the turntable rotates to the third step, the finger 180 remains in a position extending partially across the carton A, as clearly seen in Fig. 6, thus holding the extension 198 of band 38 in its folded position across carton A and preferably pressing inwardly on said carton A.

At the third step shown in Fig. 6, glue is applied to the outer side of extension 198 of band 38 so that when extension 199 is folded to the position of step four of Fig. 6, both extensions are adhered together completing the package. The gluing step by which the extensions 198, 199 are secured together will be described later so that the remainder of the operation of fingers 179, 180 may now be described.

Referring to Figs. 5, 6 it is seen that the circumferential extent of cam 182 and its location is such that when the cartons are at the second or handle inserting step, roller 175 which operates finger 179 is still on the stationary cam 178 while roller 176 which actuates finger 180 is in a position to be acted upon by cam 182 as above described.

As the turntable 25 revolves another 90 degrees (and after the cam 182 has returned to its "up" position) roller 176 moves out of the influence of cam 182 (Fig. 5) so that, at the glue application station, the finger 180 remains in the same position to which it has been moved (Fig. 6). However, roller 175 takes up a position (see third step Fig. 6) in which it may be depressed by a low portion 181a of cam track 181 carried by cam 182. Thus upon downward movement of shaft 183 (Fig. 6) roller 175 is substantially depressed so as to swing finger 179 through a sufficiently large arc to fold extension 199 of band 38 across the already folded extension 198. This step is of course performed after the glue has been applied to extension 198 in a manner to be described.

Between the gluing station (third step) and the discharge station (fourth step) the rollers 175, 176 pass over another movable cam generally designated 200 (Fig. 6) which is supported for vertical translation at the upper end of a reciprocable shaft 201 (Figs. 4, 6) which may be reciprocably supported in a manner similar to shaft 183.

Shaft 201 is connected at its lower end to one end of a generally horizontally extending arm 203 (Figs. 3, 4) secured at its opposite end to a sleeve 204 (Fig. 4) which in turn is rotatably supported on a shaft 205 stationarily supported between structural flat bars 206 or the like.

Also secured to sleeve 204 is one end of an arm 207 which is provided at its opposite end with a roller 208 for engagement with a radial cam 209. This radial cam 209 is carried by shaft 83 hereinbefore described and which rotates at the same speed as shaft 50. In other words, the vertical reciprocation of shaft 201 is of the same frequency as shaft 183 which actuates cam 182.

As best seen in Fig. 6, the function of cam 200 is to return the rollers 175, 176 to their initial upper position and therefore return the fingers 179, 180 to their vertical positions permitting discharge of the cartons from pocket 32 and the subsequent insertion of the next pair from the carton feed turntable 28.

Glue injector

As noted above, the application of blue to the outwardly facing side of extension 198 of band 38 is performed as a third step in the operation of turntable 25, or at a point 90 degrees from the handle inserting step.

Referring to Figs. 1, 10, the glue applicator, generally designated 212 may be supported on the top of housing 1 and comprises a reservoir 213 containing a charge of liquid glue 214. A relatively heavy bottom 215 may be provided in which heater elements indicated at 216 can be inserted if it is desired to heat the glue. A drain 217 is provided in the usual manner.

An ejection pump unit 218 is vertically disposed in the reservoir 213 and is secured at its lower end to bottom 215 by means of bolts 219. The ejection pump unit is somewhat similar to a diesel fuel injector and is provided with supply ports 220 communicating between a centrally axially extending bore 221 and the glue charge 214.

The bore 221 in ejector 218 is connected with a passageway 222 in the bottom 215 which has sa horizontally extending branch 223 directed outwardly of the glue applicator and in line with the folded over extension 198 of band 38.

A fitting 225 is screwthreadedly secured in the bottom 215 and is provided with a central axial bore 226 which is enlarged at the outlet end to provide a seat for a ball 227. A helical compression spring 228 acts between ball 227 and a plug 229 so that passage of glue through fitting 225 occurs only when the pressure in passageway 222 exceeds a predetermined minimum.

The plug 229 is provided with a central bore 230 and a nozzle 231 is secured to the outer end of fitting 225 by a coupling 232 to receive the glue from bore 230.

Nozzle 231 is provided with one or more relatively small discharge orifices 233 through which the glue is ejected (Figs. 10, 11).

Pressure on the glue in bore 221 is applied by means of a piston 235 which is connected at its upper end to an adustment device generally designated 236 by which the effective length of the stroke of piston 235 may be adjusted.

The device 236 is in turn secured to the lower end of a link 237 which is pivotally connected at its upper end to a lever arm 238. Lever arm 238 is swingably supported intermediate its ends on a bracket 239 carried by reservoir 213 and is connected at its opposite end to the upper end of a vertically disposed rod 240. This rod 240 is pivotally secured at its lower end to one end of an arm 241 which is pivotally supported intermediate its ends to a bracket 242 fastened to housing 1. The opposite end of arm 241 carries a follower roller 243 which coacts with a radial cam 244.

Cam 244 may be rotated in any desired manner so long as the piston 235 is caused to be reciprocated once for each quarter revolution of turntable 25 and with the required timing. One arrangement is shown in Fig. 4 wherein shaft 51, hereinbefore described, is provided with an integral extension 245 to the end of which is secured a bevel gear 246.

Bevel gear 246 meshes with a similar bevel gear 247 carried by a shaft 248 at right angles to shaft 245. Shaft 248 in turn carries the radial cam 244 so that the piston 235 is activated once for each quarter revolution of the turntable 25.

By the above described structure, and by proper design of radial cam 244 it will be seen that glue may be dispensed by glue aplicator 212 when the cartons have stopped at the third position of Figs. 5, 6.

The glue applicator 212 is extremely important to the success of the present invention and its particular construction is critical in several respects. Prior art gluers for performing analogous functions have heretofore been of the type whereby a brush, roller or the like having glue thereon is brought into engagement with the surface to be glued, as for example the extension 198 of band 38 (Fig. 6). Inasmuch as a fast drying glue is required to achieve high speed operation of the machine, the glue, in the past, has not been applied with the speed required for efficient operation. Furthermore, the use of a glue pot for supplying glue to the applicator is a messy procedure and one that requires constant attention and cleaning.

The main disadvantage of prior art gluing devices, however, resides in the fact that the glue, upon exposure to air, tends to form a skin which reduces the adherence to the paper. By the use of the glue applicator 212 above described the above disadvantages are overcome.

The cam 244 is so formed as to cause a sharp reciprocation of piston 235 downwardly from the position of Fig. 10 and return. Piston 235 is provided with a helix barrel portion 250 as in a "Bosch" diesel engine injector. A detailed description of the piston 235 is not given herein but the same is similar to the piston of a diesel engine injector and no claim is made to the piston construction except in combination with the remainder of the glue dispenser and except insofar as the same carries out a step in the method herein claimed.

As in the "Bosch" type diesel fuel injector, rotation of the piston 235 changes the relationship of the helix of the helix barrel portion 250 with respect to the ports 222 thereby changing the effective stroke of the piston 235 by adjusting the point at which pressure applied by piston 235 is relieved into the charge of glue 214 in the reservoir 213. A handle 251 may be provided on link 237 for such adjustment.

As seen in Fig. 11 the orifices 233 in nozzle 231 are enlarged at their discharge ends by recesses 252 which are preferably in the order of .005 inch deep and .004 inch in diameter when the diameter of the orifices 233 is about .01 inch and .0625 inch long as indicated in Fig. 11.

The recessed or countersunk discharge ends 252 are very important inasmuch as they serve to retain the relatively small amount of glue which is discharged through orifices 233 by inertia after the pumping action of piston 235 has stopped. In other words, by providing a small reservoir for such excess through recesses 252, the glue is prevented from dripping down the outside of nozzle 231. The excess glue which is received in the recesses 252 at the end of the pumping stroke forms small balls because of the glue's surface tension and in the next discharge stroke of the piston such excess is propelled out of the recesses ahead of the succeeding glue jet. In this manner, the nozzle 231 is kept clean at all times and there is no tendency for the glue to drip.

It will be understood that an extremely high pressure on the glue is achieved and therefore a very high velocity in the glue jet. In the present case the advantage of this method of applying the glue lies in the fact that the glue penetrates the surface of the paper or other material to be secured, resulting in optimum adhesion. In addition, the formation of a skin around the applied glue is practically eliminated because of the speed of application. In quick drying glues, which must be employed, this is extremely important. The speed with which the glue is applied minimizes the effect of the air on the glue and this of course reduces the formation of surface skin on the glue. The stroke of piston 235 takes place in only a fraction of a second.

Although in the present case the cartons are preferably stationary when the glue is applied this is not a necessary requirement. In fact, a most important advantage of the use of a high speed glue jet resides in the fact that the articles to be glued may be moving at a very rapid rate and the injector may be timed by appropriate cam actuating means to dispense glue jets at high frequency. In addition, in installations in which it is difficult to position the glue injector adjacent the articles to be glued, the injector may be positioned at a relatively great distance from articles. Since the glue jet has such a high velocity, it may be carefully aimed by adjustably positioning the injector with the assurance that each successive jet will be identical. Because the injector lends itself to accurate timing it is even possible to employ it in situations where there are moving parts between the injector and the articles to be glued if such moving parts have a cyclical movement and are not directly between the injector and articles when the glue jet is released.

Referring again to Figs. 5, 6, it is seen that after the glue is applied to the extension 198 of band 38 the cam 182 is lowered to fold extension 199 over extension 198. The folding finger 179 of course remains in the full line position shown in the third step of Fig. 6 until the turntable 25 rotates another 90 degrees to the discharge position at which point the cam 200 is raised to swing the fingers 179, 180 to their original inactive vertical position. The completed cartons are now ready to be discharged from the turntable 25 to the take away belt 253.

*Carton discharge means*

The means for discharging the cartons from turntable 25 has been described above and comprises a plate 76 actuated by a pair of arms 74, 75. Arms 74, 75 are carried on the ends of shafts 71, 72 and are intermittently actuated by the vertical reciprocatory movement of rack 81 above described.

The take-away belt 253 may be driven by any desired means depending upon how the cartons are to be disposed of for shipment.

*Carton turning means*

Referring now to Figs. 22–24, it will be noted that a conventional rectangular carton of the type employed in the present invention is provided with a pouring opening (not shown) which is closed by means of a hinged cover 255. It is desirable that the handle C, above described, be inserted between two cartons A, B arranged so that the peripherally extending lips 101 (Figs. 2, 15, 17, 19) which engage handle C are not the ones adjacent the cover 255. In other words, the cartons are preferably arranged as shown in Fig. 25 so that the handle C is inserted between the cartons of each pair A, B. By this arrangement the handles are more easily inserted and there is no danger of the carrier causing the covers 255 to open.

Cartons discharged from the filling machine are, of course, arranged in the same manner. In other words, the cover 255 is always in the same position relative to the carton as for example the position of carton A (Fig. 22).

An automatic turning device shown in Fig. 26 is provided to arrange the cartons as shown in Fig. 25. This device comprises a freely rotatable member 257 which is rotatable about a vertical axis on a pin 258 fastened to the side strip 259 of the feed conveyor 31 which feeds the filled cartons to the turntable 28 (Fig. 1). On the opposite side of conveyor 31 from the member 257, the side strip 260 is formed with a concave inwardly opening recess 261 for a purpose to be described.

The turning member 257 is symmetrical about its central axis and is provided with right angle notches 262 defined by a relatively short side 263 and a relatively long side 264. There are also provided relatively long fingers 265 which are adapted to be engaged by the cartons as seen in Figs. 22–24.

It will first be assumed that the member 257 is in the position of Fig. 22 and that a row of cartons are approaching the same on belt 31 from right to left in equally spaced relation. This latter requirement may be met by driving conveyor 31 at a higher speed than the conveyor from which the cartons are received, and on which the cartons are in adjoining relationship. Or, if desired, any conventional article spacing device may be employed.

As carton A moves from right to left as seen in Fig. 22 it engages finger 265 and drives the member 257 in a counterclockwise direction to the position of Fig. 22. Such movement of carton A is substantially unresisted and the member 257 is prevented from overrunning the position of Fig. 23 because of the shape of the member 257. Thus as carton A passes the member 257, unaffected thereby, carton B is engaged by the notch 262 which permits further movement of carton B to the left only by the latter rotating through 90° to the dotted line position of Fig. 24. It is to permit this movement of carton B that the concave recess 261 is provided. When carton B has passed in its 90° angularly offset position the member 257 has been turned to the original position of Fig. 22, in which position it is engaged by the next carton A.

The turning member 257 is extremely effective in properly orienting the cartons and is inexpensive to provide and requires no power other than that provided by the cartons themselves.

The invention hereinbefore described provides a package such as is shown in Fig. 15 wherein the tabs 149, 150 are received under the lips 101 of the cartons A, B.

The tab folding mechanism of Figs. 7, 8 may be somewhat simplified by providing a single tab as shown in Figs. 17, 18. In this case the handle 268 is provided with finger holes 269 as in the case of handle C but only one tab 270 is provided. In such a case greater reliance is placed on band 38 to hold the cartons A, B together against the tendency for the handle 268 to be pulled out when the latter takes the weight of the two cartons of milk. However, it has been found that one such tab is adequate but the provision of two tabs as in the handle C is preferred as giving a greater factor of safety. If the handle 268 is employed, the guide piece 154 may be omitted from the handle inserting device (see Fig. 8).

In manufacturing cardboard items such as the handle C it is often preferable not to require the removal of a portion of the blank if this can be avoided. The handle illustrated as still another modified from in Figs. 20, 21 is advantageous for this reason. In this case the handle 273 is formed with a score line or perforated line of weakness 274 as in the handles previously described. However, the portions 275 previously removed to provide the finger holes 269 remain secured to the handle 273 by lines of weakness 276 and parallel lines of weakness 277 are provided centrally of portions 275. By this structure a tab 278 may be folded to one side of handle 273 along line 274 and the portions 275 may be folded double along lines 277 and folded downwardly along lines 276 to the position of Fig. 21.

It will be seen that handle 273 may be employed in substantially the same manner as handle C except that a greater amount of material is inserted between the cartons making a safer connection.

The above described structure should not be taken as restrictive of the invention as it is obvious that minor variations in design may be resorted to without departing from the spirit of the invention.

I claim:

A machine for securing a carrier to a pair of milk cartons having closed upper ends and a flange around each such end comprising: a carton support for supporting said cartons in side by side relationship, a magazine for planar handles above and horizontally offset from said cartons, means for successively feeding handles from said magazine, means for grasping the handles so fed and means for swinging said grasping means through an arc toward the line of division between the upper ends of said cartons, stationary guide means horizontally offset from the vertical central plane between said cartons and engageable with said handles during said swinging thereof for bending a portion of such handle out of the plane of said handle, means for folding over said portion against said handle, and means for inserting said handle when so folded between the upper ends of said pair.

References Cited in the file of this patent

UNITED STATES PATENTS

| | | |
|---|---|---|
| 482,542 | Butler et al. | Sept. 13, 1892 |
| 1,368,780 | Anderson | Feb. 15, 1921 |
| 1,524,399 | Krueger | Jan. 27, 1925 |
| 1,653,908 | Hunt | Dec. 27, 1927 |
| 1,814,696 | Hohl | July 14, 1931 |
| 1,914,806 | Hormel | June 20, 1933 |
| 2,187,837 | Paasche | Jan. 23, 1940 |
| 2,270,820 | Kaliska | Jan. 20, 1942 |
| 2,290,790 | Yeomans | July 21, 1942 |
| 2,509,725 | Dalton | May 30, 1950 |
| 2,662,356 | Swafford | Dec. 15, 1953 |
| 2,677,460 | Johnson | May 4, 1954 |
| 2,694,488 | Crane | Nov. 16, 1954 |
| 2,766,567 | Fahrenbach et al. | Oct. 16, 1956 |